United States Patent [19]
Nunnelley et al.

[11] Patent Number: 5,900,007
[45] Date of Patent: *May 4, 1999

[54] DATA STORAGE DISK ARRAY HAVING A CONSTRAINT FUNCTION FOR SPATIALLY DISPERSING DISK FILES IN THE DISK ARRAY

[75] Inventors: Lewis Lee Nunnelley, San Jose; Larry Lynn Williams, Los Altos; Leighton Christopher Wood, Jr., Morgan Hill, all of Calif.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/698,155

[22] Filed: Aug. 7, 1996

Related U.S. Application Data

[60] Continuation of application No. 08/382,339, Feb. 1, 1995, abandoned, which is a division of application No. 07/993,247, Dec. 17, 1992, Pat. No. 5,423,046.

[51] Int. Cl.⁶ ...................................................... G06F 12/08
[52] U.S. Cl. ................................................. 711/4; 711/203
[58] Field of Search ..................................... 395/404, 412, 395/413; 711/4, 111, 112, 114, 202, 203

[56] References Cited

U.S. PATENT DOCUMENTS

| | | |
|---|---|---|
| 4,914,656 | 4/1990 | Dunphy, Jr. et al. .................. 371/10.2 |
| 4,989,205 | 1/1991 | Dunphy, Jr. et al. .................. 371/10.1 |
| 4,989,206 | 1/1991 | Dunphy, Jr. et al. .................. 371/10.1 |
| 5,077,736 | 12/1991 | Dunphy, Jr. et al. .................. 371/10.1 |
| 5,325,497 | 6/1994 | Jaffe et al. ............................... 395/425 |
| 5,440,716 | 8/1995 | Schultz et al. .......................... 711/114 |
| 5,459,857 | 10/1995 | Ludlam et al. ..................... 395/182.04 |

OTHER PUBLICATIONS

D. L. Patton et al., "Automated Library Clean–Up Triggered by Thermal or Power Concerns", IBM Technical Disclosure Bulletin, vol. 33, No. 12, May 1991, pp. 121–122.

*Primary Examiner*—Jack A. Lane
*Attorney, Agent, or Firm*—Paik Saber

[57] ABSTRACT

A data storage and retrieval system is provided which has extremely high capacity. The system includes a large array of small disk files, and three storage managers for controlling the allocation of data to the array, access to data, and the power status of disk files within the array. The allocation manager chooses the disk files upon which incoming data is written based on the current state of the disk files (active or inactive), the available capacity, and the type of protection desired (i.e. unprotected, RAID, mirrored, etc.). The access manager interprets incoming read requests to determine the location of the stored data. The power manager sequences disk files between active and inactive to provide the storage requested by the access and allocation managers. The power manager also maintains the disk array in conformance with thermal and power constraints to avoid excessive power consumption or thermal overload while keeping active the optimal subset of the disk array based on the storage requests pending at any point in time.

28 Claims, 8 Drawing Sheets

SYSTEM CONFIGURATION

DATA FLOW

EXEMPLARY PHYSICAL LAYOUT FOR LOW POWER APPLICATIONS

| Cluster | Max Capacity(GB) | Avail Capacity(MB) | State |
|---|---|---|---|
| 1 | 1 | 500 | OFF |
| 2 | 1 | 100 | ON |
| 3 | 1 | 200 | OFF |
| 4 | 1 | 200 | OFF |
| 5 | 1 | 600 | OFF |
| 6 | 1 | 100 | OFF |
| 7 | 1 | 200 | OFF |
| 8 | 1 | 200 | ON |

SNAPSHOT OF LOW POWER CONFIGURATION

*FIG. 5*

EXEMPLARY PHYSICAL LAYOUT
FOR HIGH CAPACITY APPLICATIONS

Physical Disk File Location     Cluster

| X | Y | Z | |
|---|---|---|---|
| 1-8 | 1 | 1 | 1 |
| 1-8 | 2 | 1 | 2 |
| 1-8 | 3 | 1 | 3 |
| 1-8 | 4 | 1 | 4 |
| 1-8 | 5 | 1 | 5 |
| 1-8 | 6 | 1 | 6 |
| 1-8 | 7 | 1 | 7 |
| 1-8 | 8 | 1 | 8 |
| 1-8 | 9 | 1 | 9 |
| 1-8 | 10 | 1 | 10 |
| 1-8 | 11 | 1 | 11 |
| 1-8 | 12 | 1 | 12 |
| 1-8 | 13 | 1 | 13 |
| 1-8 | 14 | 1 | 14 |
| 1-8 | 15 | 1 | 15 |
| 1-8 | 16 | 1 | 16 |
| 1-8 | 17 | 1 | 17 |
| 1-8 | 18 | 1 | 18 |
| 1-8 | 19 | 1 | 19 |
| 1-8 | 20 | 1 | 20 |
| 1-8 | 21 | 1 | 21 |
| 1-8 | 22 | 1 | 22 |
| 1-8 | 23 | 1 | 23 |
| 1-8 | 24 | 1 | 24 |
| . | . | . | . |
| . | . | . | . |
| . | . | . | . |
| 1-8 | 44 | 1 | 44 |
| 1-8 | 1 | 2 | 45 |
| . | . | . | . |
| . | . | . | . |
| . | . | . | . |
| 1-8 | 44 | 2 | 88 |
| 1-8 | 1 | 3 | 89 |
| . | . | . | . |
| . | . | . | . |
| . | . | . | . |
| 1-8 | 44 | 31 | 1364 |

ASSIGNMENT OF PHYSICAL DISK FILE LOCATIONS TO CLUSTERS

*FIG. 7*

| Cluster | Protection | Max Capacity(GB) | Avail Capacity(GB) | State |
| --- | --- | --- | --- | --- |
| 1 | Mirrored | 20 | 10 | ON |
| 2 | RAID 5 | 35 | 15 | OFF |
| 3 | RAID 3 | 35 | 20 | OFF |
| 4 | Unprotected | 40 | 10 | OFF |
| 5 | Unprotected | 40 | 10 | OFF |
| 6 | Mirrored | 20 | 10 | ON |
| 7 | RAID 5 | 35 | 25 | ON |
| 8 | RAID 3 | 35 | 5 | OFF |
| 9 | Mirrored | 20 | 5 | OFF |
| 10 | RAID 5 | 35 | 10 | OFF |
| 11 | RAID 3 | 35 | 20 | ON |
| 12 | Mirrored | 20 | 10 | OFF |
| 13 | RAID 5 | 35 | 15 | ON |
| 14 | Unprotected | 40 | 20 | OFF |
| 15 | RAID 5 | 35 | 15 | OFF |
| 16 | RAID 3 | 35 | 20 | OFF |
| 17 | RAID 5 | 35 | 25 | OFF |
| 18 | Unprotected | 40 | 15 | OFF |
| 19 | Mirrored | 20 | 10 | OFF |
| 20 | Unprotected | 40 | 15 | OFF |
| 21 | Mirrored | 20 | 0 | OFF |
| 22 | Mirrored | 20 | 10 | OFF |
| 23 | RAID 3 | 35 | 15 | OFF |
| 24 | RAID 3 | 35 | 15 | OFF |

SNAPSHOT OF HIGH CAPACITY CONFIGURATION

*FIG. 8*

DATA STORAGE DISK ARRAY HAVING A CONSTRAINT FUNCTION FOR SPATIALLY DISPERSING DISK FILES IN THE DISK ARRAY

This is a continuation of U.S. patent application Ser. No. 08/382,339, filed Feb. 1, 1995, now abandoned, which is a divisional of U.S. patent application Ser. No. 07/993,247, filed Dec. 17, 1992 now U.S. Pat. No. 5,423,046.

FIELD OF THE INVENTION

This invention relates in general to computer storage systems, and in particular to a data storage and retrieval system which includes a large number of disk drives and control mechanisms for handling data storage, data retrieval, and power consumption to achieve extremely high overall storage capacity.

BACKGROUND OF THE INVENTION

Ongoing development activities aimed at increasing computer processor speed and data transmission rates, together with the increasing number of applications requiring display, tabulation, synthesis, or transformation of enormous amounts of data, are creating an accelerating demand for high capacity data storage systems. Examples include multimedia databases with full color images and audio, CAD/CAM drawings and associated data, full text databases with access to daily newspapers and other periodical information, and scientific data involving empirical measurements or results from mathematical calculations. Any of these applications can involve multiple terabytes of data, requiring high capacity data storage systems which use large amounts of floor space, power and cooling.

Traditionally, high capacity data storage involves large diameter, expensive disk files grouped together in sets of 2, 4, or 8 and accessed through an equally large and expensive control unit. In recent years, the commoditization of small diameter (5¼ inches or less) disk files has led to a revolution in high capacity data storage through which the small groups of large diameter disk files have been replaced by larger groups (typically 8 to 64 disk files) of small diameter, inexpensive disk files. This metamorphosis has gained additional impetus through the development of new techniques for grouping small disks that dramatically increase overall system reliability while sharply decreasing data access times, floor space requirements, and power consumption. These techniques have become popularly known as RAID technology (redundant arrays of inexpensive disks), which categorizes the trade-off between reliability and redundancy using RAID levels. Thus, RAID-1 is used to indicate mirrored storage, the most reliable but also the most costly alternative. RAID-5 is used to indicate parity protected storage in which parity is spread across a set of disk files. Other RAID levels are available, and are discussed in detail in the literature. Similarly, other data protection mechanisms are available which are useful in grouping numerous small disk files.

Existing data storage systems built around RAID technology typically include approximately 10 to 100 individual disks housed in one or more racks, spaced from one another to allow cooling air to flow between them. This approach has proven sufficient to date because the total power and thermal loading created by 10 to 100 disks is readily manageable, and because the total space occupied by such a system, even including ample space between the disk files, is manageable.

However, existing packaging and power handling concepts are not sufficient for use with denser and larger arrays required to store high volume data. For example, at a typical power consumption rate of 50 mW/megabyte (M-byte), a 10 terabyte disk array would required 500K W of input power to service the disk files alone. This would create a power requirement unacceptable to most users, and a cooling problem of sizeable proportions. Moreover, using today's technology tens of thousands of small disk files are required to provide this level of storage capacity. This would translate into a significant floor space requirement which also is unacceptable to many users. And, any attempt to reduce the spacing between individual disk files as a means of reducing the overall floor space requirement would worsen the cooling problem, rending the data storage system inoperative. Thus, what is needed to meet all user criteria is a data storage system having a large number (potentially tens of thousands) of closely spaced small disk files with low power and thermal requirements.

SUMMARY OF THE INVENTION

In accordance with the present invention, a data storage and retrieval system is provided which has extremely high capacity. The system includes a large number of small disk files, and storage management subsystems (storage managers) for controlling the power status of the disk files and the allocation of data to the disk files. Prior to operation, a configuration management subsystem (configuration manager) included in the system organizes the disk files into logical clusters in accordance with the user's anticipated storage requirements. A cluster may consist of a single disk file or multiple disk files; in the preferred embodiment clusters are organized as RAID arrays.

During operation the storage system is controlled by the storage managers. The storage managers minimize internal thermal loading and power consumption for the disk array by placing clusters in an inactive mode when not in use. Subsequently, clusters may be placed in an active mode when one or more of the storage managers determines that their use may be required. One storage manager, known as an allocation manager, chooses the clusters upon which incoming data is written based on the current state of each cluster (active or inactive), the remaining capacity in each cluster, and the type of protection desired (i.e unprotected, RAID, mirrored, etc.). The resulting allocation is then provided to a second storage manager, known as a power manager. Meanwhile, a third storage manager, known as an access manager, interprets incoming read requests, determines the cluster location of the stored data, and provides this information to the power manager. The power manager collects incoming requests and sequences clusters between active and inactive in an optimum manner consistent with the power and thermal constraints of the data storage system.

BRIEF DESCRIPTION OF DRAWINGS

FIG. 5 is a table illustrating the status of an exemplary low power data storage system at a particular point in time.

FIG. 7 is a table illustrating a cluster mapping schema for an exemplary high capacity data storage system.

FIG. 8 is a table illustrating the status of an exemplary high capacity data storage system at a particular point in time.

DETAILED DESCRIPTION OF THE INVENTION

I. System Architecture

Figure 1:
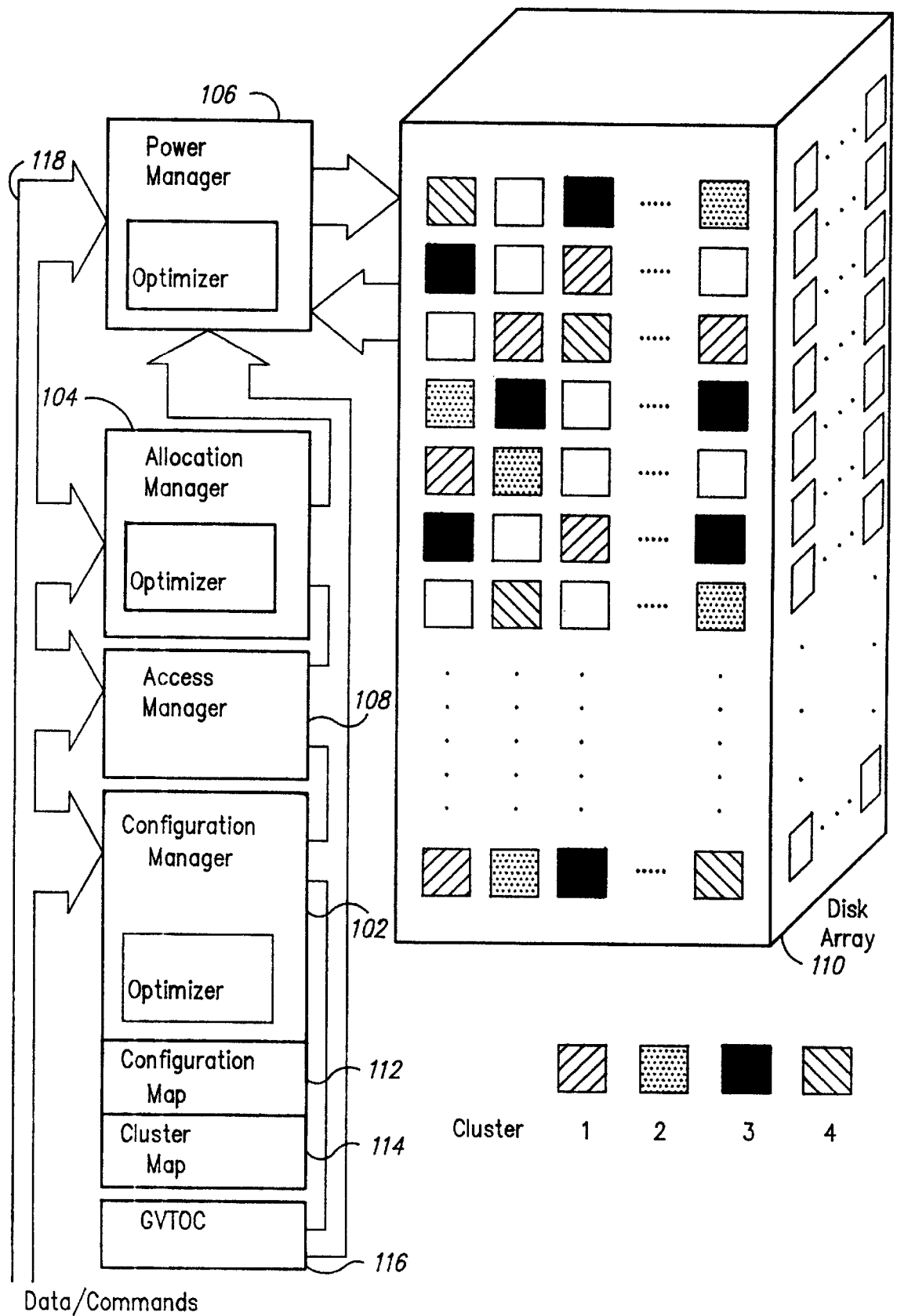
FIG. 1 is a block diagram illustrating the basic architecture for the data storage system of the present invention.

Shown in FIG. 1 are the basic architectural components of the data storage system of the present invention. The system includes configuration manager 102, allocation manager 104, power manager 106, access manager 108, disk array 110, global volume table of contents (GVTOC) 116, and data/command bus 118. Configuration manager 102 itself includes configuration map 112 and cluster map 114. Disk array 110 includes a plurality of individual disk files, shown as variously cross-hatched squares. In practice, hundreds or even thousands of disk files may be compactly packaged in disk array 110.

Prior to operation, disk array 110 is configured into subsets called clusters. The configuration process is carried out under control of configuration management system (configuration manager) 102, and may be initiated by information provided during the manufacturing process or alternatively by the user in order to customize the system to specific requirements. In either event, configuration manager 102 accepts data indicative of what fraction of the available storage will be devoted to highly redundant mirrored data, what fraction will be devoted to RAID-5 data, what fraction will be used for unprotected data, etc. together with system constraints indicative of thermal loading characteristics of disk array 110, and determines the appropriate number of clusters and cluster sizes to create the desired mix, as well as an optimal mapping of disk array 110 into the clusters. The mapping is generally calculated to disperse the disk files in a given cluster such that all files in the cluster can be active simultaneously without creating a localized thermal overload situation, or "hot spot", in disk array 110. A small exemplary portion of such a mapping is shown in FIG. 1, where the disk files in cluster 1 are dispersed from one another, as are those in cluster 2 and cluster 3, etc. Once configuration manager 102 has completed the mapping, it stores the accumulated data in configuration map 112 and cluster map 114, as will be discussed in more detail below.

The operation of the data storage system centers around power management subsystem (power manager) 106, which manages disk array 110 such that at any point in time some disk files are active and others are inactive, and further such that the disk files which are active are those determined to be the best suited to serving the read and write storage requests pendign in the system at that time. As used herein, "active" refers to a disk file that is powered-on and ready to read or write data, while "inactive" refers to a disk file that is not presently read to read or write because it is powered-off or because it is in some intermediate low-power quiescent state, such as with its electronics active but its disk stopped. Power manager 106 sequences the various disk files in accordance with lists of cluster numbers received from allocation management subsystem (allocation manager) 104 and access management subsystem (access manager) 108. These lists are in turn generated in response to storage requests received from computer systems attached to data/command bus 118.

More specifically, storage write requests are received by allocation manager 104. A write request typically includes a dataset along with commands identifying the minimum redundancy level at which the dataset may be stored. As used herein, "dataset" refers to any block of data which is the subject of a storage request; a dataset may be identified by starting point and length, by name, or by any other suitable means. The minimum redundancy level may be unprotected for data whose loss can be tolerated, mirrored for critical data, RAID-5 for data of intermediate importance, or any other protection scheme identified to the data storage system. The allocation manager determines which cluster or clusters in the system are best suited to storing the dataset. Factors considered by the allocation manager may include the space available on various clusters, their redundancy level, the performance impact of making various clusters active or inactive, and the performance advantage of spreading a large dataset over multiple clusters, among others. In the preferred embodiment, the allocation manager develops a list of optimal clusters using a linear cost function and a linear constraint function.

The allocation manager passes the cluster list to the power manager, whose function it is to make the clusters active so that the dataset can be stored. The power manager determines which physical disk files must be active to fulfill the storage request by referring to cluster map 114. It then combines these files with those from other pending storage requests and determines which disk files to keep active, which to activate, and which to deactivate. Factors considered by the power manager may include the total allowable power consumption for the disk array, the maximum allowable local thermal loading within portions of the disk array, the power savings that can be achieved by activating fewer disks files than would be allowable based on power and thermal loading requirements, and the time required to activate and inactivate a disk file, among others. In the preferred embodiment, the power manager develops a linear cost function and a linear constraint function whose combined solutions determine the optimal set of disk files to be active at any point in time. The data is staged to the various disk files as they are activated and deactivated, and the storage write operation is complete.

Storage read requests are received by access manager 108. A read request simply identifies a dataset to be extracted from disk array 110. Access manager 108 determines which cluster or clusters contain the requested dataset, and passes the cluster list to power manager 106. Power manager 106 determines which disk files must be activated to fulfill the request, and adds them to its cost and constraint functions as described above. As the data becomes available, it is assembled into the requested dataset. Upon completion the dataset is provided to the requesting computer system over data/command bus 118, and the storage read operation is complete.

II. System Configuration

The data storage system of the present invention includes a disk array containing a substantial number (hundreds or thousands) of individual small form factor (1.8, 2.5, 3.5, etc.) disk files organized into logical clusters of disk files. A cluster may contain one disk file or dozens of disk files, depending upon the system configuration provided for a given user installation. The cluster configuration itself, which defines the clusters, may be provided by the manufacturer of the data storage system or alternatively may be customized by the user to suit specific requirements.

Figure 2:
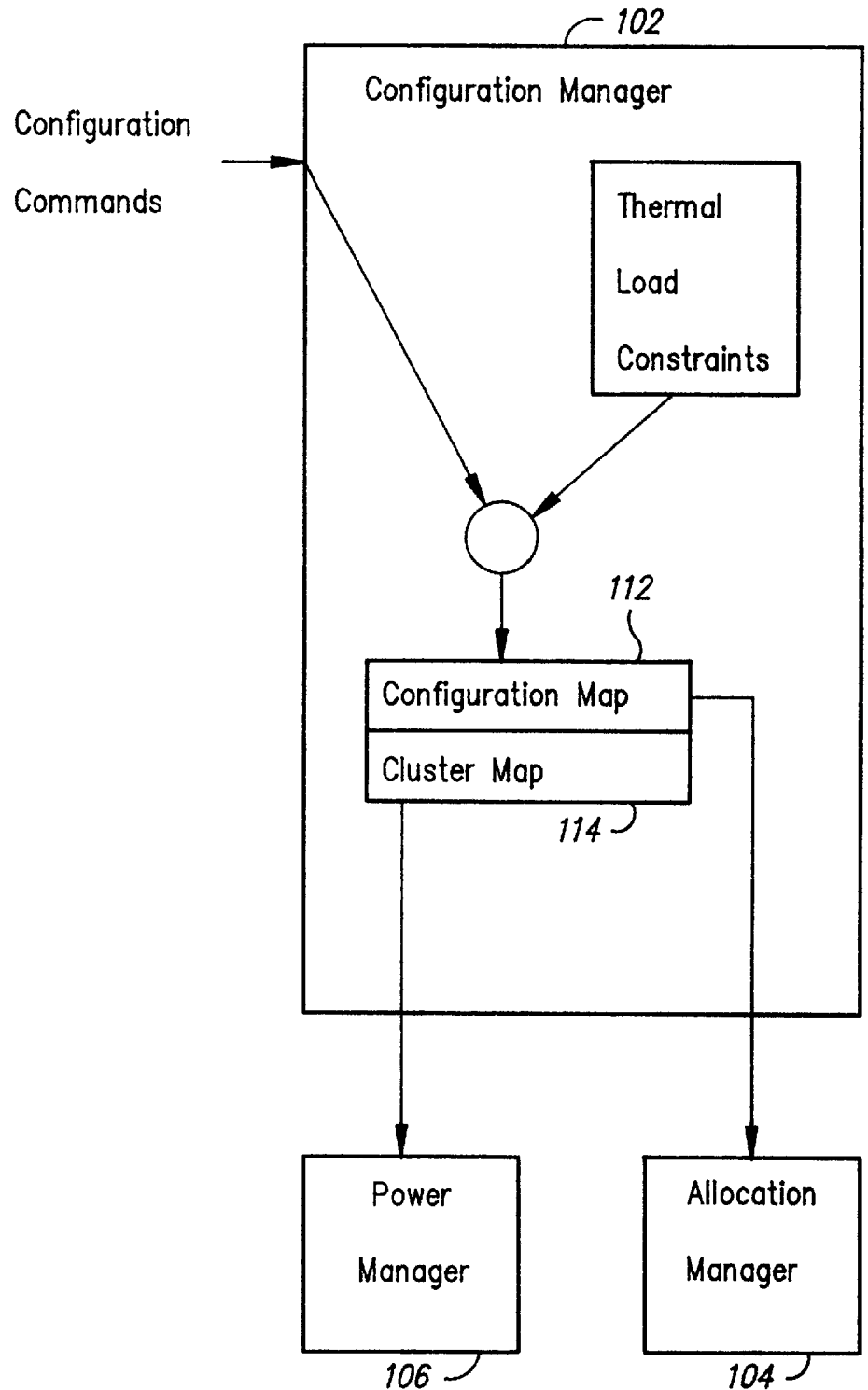
FIG. 2 is a block diagram illustrating the system configuration processing of the present invention.

Shown in FIG. 2 is a block diagram representing the system configuration process for the present invention. Configuration manager 102 receives configuration commands from the user, or in the case of a default configuration provided by the manufacturer, from a configuration dataset.

The configuration commands specify the amount of storage capacity by quantity, percentage, or any other suitable measure, that is to be allocated at various levels of redundancy. This may include unprotected storage, mirrored storage, RAID level 5 storage, RAID level 3 storage, etc. The configuration commands may also specify the desired excess capacity as well as the desired access rate for a particular block of storage, such as high speed access, low speed access, etc. Configuration manager 102 combines the required capacity, excess capacity, and redundancy information to determine the number of disk files required to satisfy the configuration command. It assigns a cluster number to the command, and then allocates physical disk files in the storage array to the cluster. The files are allocated according to the system's thermal load constraints, which causes them to be physically dispersed from one another such that localized hot spots will not occur when the cluster is made active. One possible implementation is to assign clusters using a simple regular algorithm, for example files 1 to n assigned to cluster 1, files n+1 to 2n assigned to cluster 2, etc., provided the selected assignment meets the thermal constraints such that all files in the cluster can be active concurrently. Other assignment options include square clusters or cubic clusters.

A linear, square, or cubic assignment as described above may unnecessarily limit the number of clusters that can be active at one time. In the preferred embodiment, clusters are assigned using a mathematical programming function which creates the required dispersion in accordance with principles to be discussed in more detail below. Briefly, constraints are identified to describe the minimum allowable distances between disk files within a cluster and in adjoining clusters. An optimizing function is developed which maximizes the dispersion of disk files, consistent with the bounds of the array and the foregoing constraints.

The difficulty of the assignment process can range from nearly trivial to very complex, particularly if the number of clusters that can be active based on local thermal loading constraints is significantly less than the number that can be active based on total power consumption constraints. For example, if a cube of 8×8×8 disk files is known to create a hot spot, a constraint would be established such that 64 adjacent clusters (8×8×8) could never be active at the same time. If the power limit for the entire array is less than 64 clusters, a hot spot will never occur, regardless of cluster selection. But if the power limit for the array is significantly greater than 64 clusters, it becomes preferable to spread the individual disk files associated with a given cluster over a larger area so that any 63 clusters may be active without creating a hot spot. As a further complication to the configuration process, different clusters may contain different numbers of disk files. For instance, mirrored clusters may contain a different numbers of files from RAID clusters, which in turn may contain a different number of files from unprotected clusters.

Once the clusters and disk files are assigned, the correspondence between configuration commands and assigned cluster numbers is stored in configuration map 112. Likewise, the correspondence between cluster numbers and physical disk files is stored in cluster map 114. The contents of configuration map 112 are provided to allocation manager 104, which uses this information during operation to determine cluster numbers based on the redundancy requirements for datatsets received from attached computer systems. The contents of cluster map 114 are provided to power manager 106, which uses this information during operation to determine physical disk files based on cluster numbers.

III. Application of Linear Programming to Configuration, Power, and Allocation Management In mapping the disk array into clusters, the configuration manager seeks to spread clusters and the individual disk files in the clusters so that in operation the maximum possible number of clusters can be active simultaneously, consistent with the total power limit and local thermal loading constraints for the storage system. Once the disk array has been mapped into clusters, the power manager is responsible for controlling the power status of each cluster so that, at any given point in time, the total power consumption of the diskarray is within allowable limits and the localized thermal load is within allowable limits. In accordance with the preferred embodiment of the present invention, a linear programming approach is used by the configuration manager and the power manager to determine the optimal organization for the disk array and the optimal power status for each cluster in the disk array. Constraints corresponding to physical requirements (such as total power consumption and local thermal loading) are identified and quantified, and used by the configuration manager to develop the optimal cluster mapping. In operation, these same constraints are combined with data availability costs associated with the active/inactive state of clusters to determine, at any point in time, the optimal set of clusters to be made active.

For an array consisting of n total clusters, system power constraints will dictate that only m clusters may be active at any single time. If a variable F(i) is defined such that F(i)=0 for cluster i when that cluster is inactive and F(i)=1 for cluster i when that cluster is active, then $$F(1)+F(2)+ \ldots +F(i) \ldots +F(n) \leq m. \qquad (1)$$

Additionally, if D(i) is defined as the desirability of the i'th cluster being active, then the optimal solution is given by $$F(1) \times D(1)+F(2) \times D(2)+ \ldots +F(n) \times D(n)=\text{maximum} \qquad (2)$$

Thus, the configuration manager must devise a cluster mapping and the power manager must select the set of active clusters such that (1) and (2) are both satisfied.

However, even if the total system power is constrained in conformance with (1), localized "hot spots" may result if numerous disk files are active in a concentrated region of the disk array. Additional constraints may be added to address this exposure. The exact nature of these constraints depends upon the cluster configuration of the array. For example, if the clusters are arranged such that within any set of ten clusters thermal loading constraints permit only two clusters to be active simultaneously, then the additional constraints defined are:

$$F(1)+F(2)+F(3)+ \ldots +F(10) \leq 2$$

$$F(11)+F(12)+F(13)+ \ldots +F(20) \leq 2$$

$$F(n-9)+F(n-8)+F(n-7)+ \ldots +F(n) \leq 2$$

In the above case, both the configuration manager and the power manager handle local thermal loading at the cluster level. In a more complex embodiment in which cluster size varies or the disk files comprising the various clusters are distributed unevenly throughout the disk array, the configuration manager and power manager may be required to consider the detailed location of each disk file in the cluster to handle local thermal loading constraints. In this case the constraint functions are constructed with reference to disk files rather than cluster numbers. Then the configuration manager and the power manager convert cluster numbers to disk files before solving the constraint functions. Otherwise operations proceed the same as where configuration management/power management is conducted at the cluster level.

Costs are assigned at configuration time in accordance with the configuration selected by the system user. As used herein, "cost" refers to the desired level of availability associated with a particular cluster. A low cost is attributed to clusters requiring high-speed access and to clusters for which frequent access is expected. This latter group may include clusters containing pointers to data in other clusters, clusters containing global volume-table-of-contents (GVTOC) information for the entire disk array, and clusters containing directory information for an operating system running on a computer system having access to the data storage system. Conversely, a high cost is attributed to clusters for which a lower access rate can be tolerated. This may include clusters storing archival information which is infrequently referenced, or bulk data such as image files.

During operation of the data storage system, the costs associated with various clusters may be dynamically modified by request of the allocation manager or the storage manager. Such requests are placed in response to actual storage and retrieval frequency experienced in specific clusters, as well as anticipated requirements.

In addition to the constraints and costs governing the function of the configuration manager and the power manager, a separate set of constraints and costs are applied by the allocation manager to determine the optimal cluster or clusters upon which to store incoming data. A constraint is established for each cluster representing the excess data capacity remaining in that cluster. A second constraint, called a "striping constraint," is added if it is desired to force the dataset to be spread across multiple clusters in accordance with redundancy techniques well know in the RAID art. In general, striping of this sort also tends to reduce system overhead and improve performance by enabling the storage system to begin transferring data to/from active clusters while simultaneously activating other clusters whose use is required to complete the storage read/write request. The effect is enhanced further if a portion of each striped dataset is allocated to a normally-active cluster (a cluster with a low cost function assigned to it), since this virtually guarantees that data transfer can begin immediately upon receipt of the storage read/write request.

Having established is constraints, the allocation manager proceeds to construct a cost function which represents the overhead (time and storage space) involved in storing the data in a cluster having more than the required level of redundancy, the expense involved in making an inactive disk file active, and the expense of storing data in a cluster having more than the required level of availability. The equation set representing the costs and constraints is solved by the allocation manager to produce an optimal allocation of the data set over the available capacity. The resulting cluster numbers are passed to the power manager so that the appropriate disk files can be made active and the data recorded.

It is to be noted that while the preferred embodiment of the present invention uses linear programming concepts to provide an optimal set of available disk files, other techniques may be readily substituted, including heuristics and statistical tracking. Additionally, any number of constraints and costs may be added to those discussed above in determining the optimal availability mix for a given installation and the optimal spread of data across the available capacity. For example, a constraint may be used to further limit the density of available disk files in regions of the storage array known to receive low thermal cooling; another constraint may be used to lower total power consumption during certain times of the day or week when overall usage may be particularly low or utility rates particularly strained. A cost function may be added to increase the cost of larger clusters; another cost function may be used to lower the cost of particular clusters at certain times, such as clusters containing users' personal storage during business hours, or clusters containing batch jobs during off-shift hours. Yet another cost function may be tailored to keep some clusters nearly full while maintaining others nearly empty.

IV. System Data Flow

Figure 3:
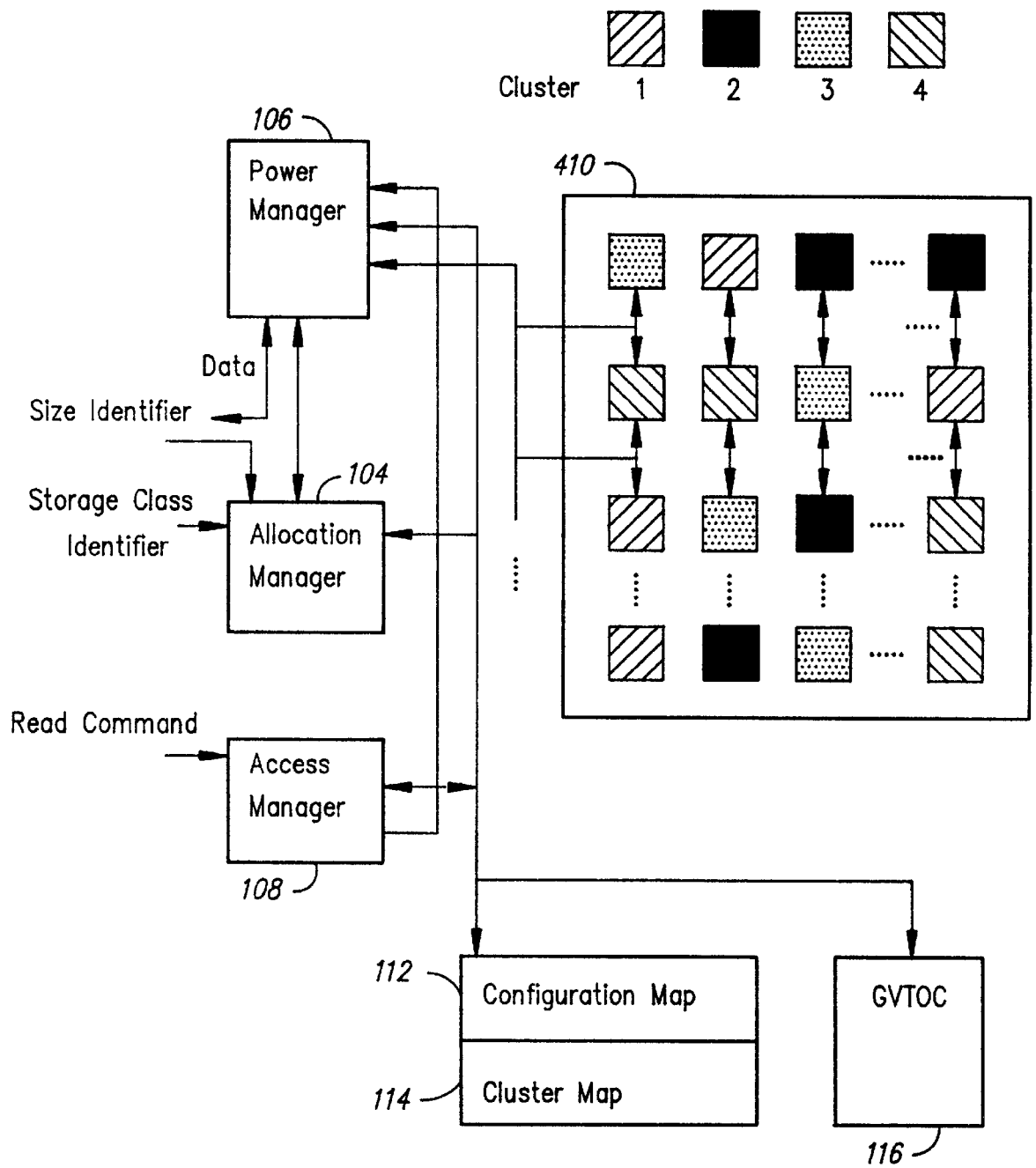
FIG. 3 is a block diagram illustrating data flow for the data storage system of the present invention.

Shown in FIG. 3 is a block diagram representing the data flow provided in accordance with the present invention. During normal operation, a data write sequence begins when allocation manager 104 receives a write command that includes a size identifier and a storage class identifier. The size identifier indicates the amount of data to be written; the storage class identifier indicates the minimum required redundancy level for the data, such as RAID level 3. Allocation manager 104 searches configuration map 112 for one or more clusters having the appropriate redundancy level, and then checks GVTOC 116 to determine available capacity. If sufficient storage cannot be located at the minimum required redundancy level, clusters at the next more secure redundancy level are checked until sufficient space is found for the data. Allocation manager 104 also applies cost and constraint functions to the available clusters to determine the optional one(s) to fulfill the write request based on availability, capacity, etc., as described above.

The determined cluster identifier(s) are then passed to power manager 106. Power manager 106 searches cluster map 114 to determine the physical disk files corresponding to the cluster number(s). Power manager 106 then calculates its cost and constraint functions for identified physical disks 410, and proceeds to make them available for use—by adjusting costs if necessary—in accordance with the resulting solution to the optimization problem. Clusters that are not needed are assigned a high cost, and clusters that are required are assigned a low cost. These costs can be modified as necessary for aging or high priority requests. Power manager 106 maintains a record of the cluster sequencing corresponding to each request so that clusters can be brought on line in anticipation of their use by dynamically adjusting their cost functions. Finally, when the clusters are available, the data is transmitted to the disk file(s), and GVTOC 116 is updated to record the location of the data.

A data read sequence begins when access manager 108 receives a read command that identifies a dataset stored in the disk array. Access manager 108 searches GVTOC 116 to determine the cluster(s) on which the data is located, and then provides this information to power manager 106. Power manager 106 searches cluster map 114 to determine the physical disk files corresponding to the cluster number(s). Power manager 106 then adjusts the cost functions for the identified physical disks and proceeds to make them available for use in accordance with the resulting solution to the optimization problem. Finally, when the cluster(s) are available the data is read from the disk files and provided to the requesting computer system.

As is shown in FIG. 3, in the preferred embodiment data is transmitted through the power manager on its way to and from the disk array, without passing through the allocation manager. However, numerous alternatives are available which would not represent a departure from the spirit and scope of the present invention. For instance, data accompanying a write request could be staged through the allocation manager, then directly into the disk array upon signal from the power manager. Likewise, data for a read request could be staged through the access manager. Or, an additional caching storage unit could be added to the subsystem, and all data staged into the cache, with a direct link between the cache and the disk array. Or, if an implementation required, all write data could be routed through both the power manager and the allocation manager, while all read data could be routed through both the power manager and the access manager.

V. Exemplary Low Power Configuration

Figure 4:
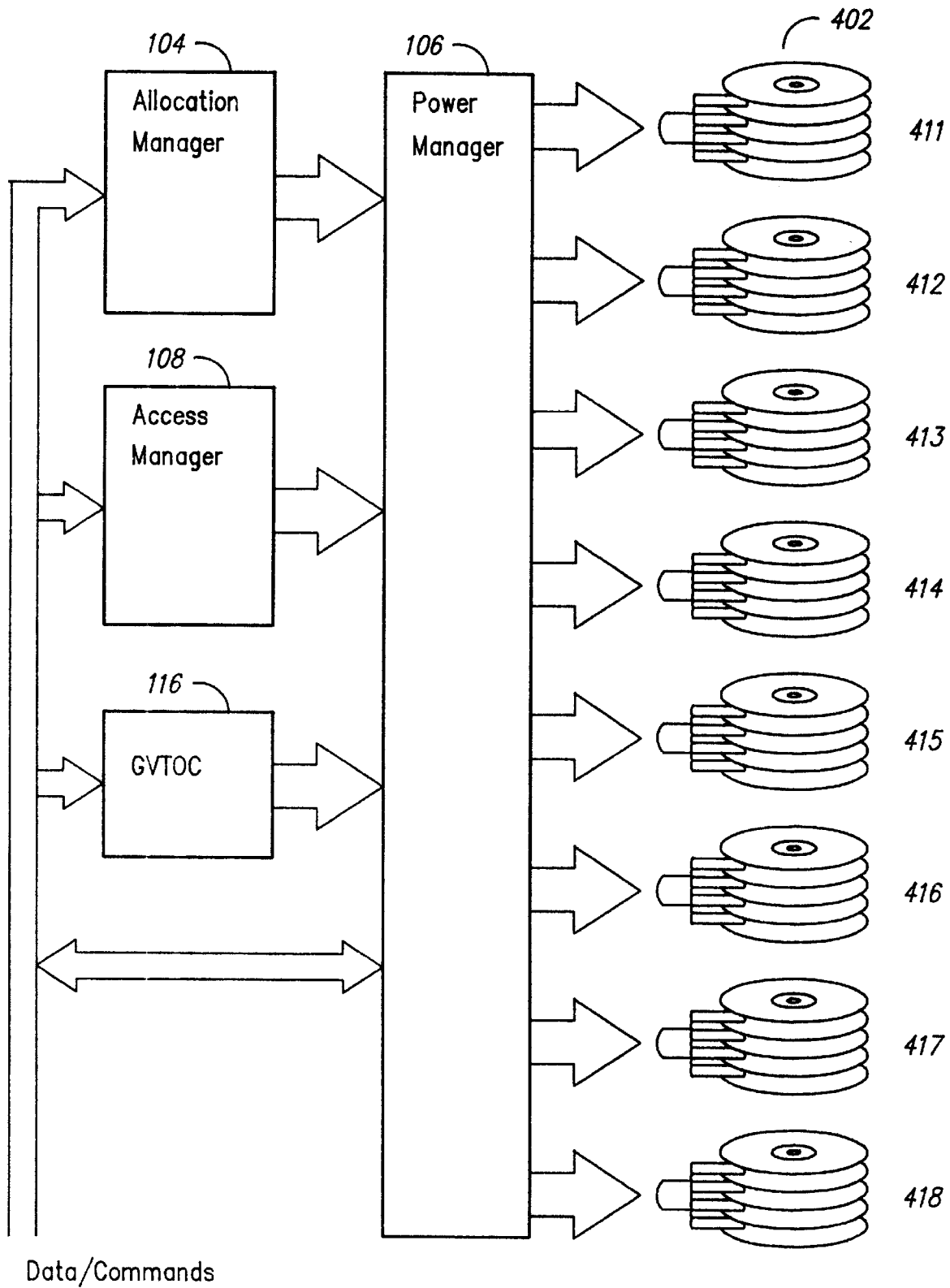
FIG. 4 is a block diagram illustrating an exemplary physical layout for low power applications.

Shown in FIG. 4 is a block diagram representing a simple application of the present invention to a low-power disk array. Such a configuration may be applied to a portable computer system, such as a laptop or other personal computer having a constrained power supply, to achieve high storage capacity and availability with low power consumption. The arrows indicate direction of flow of array management information. Disk array 402 is divided into 8 clusters labelled 411–418, one cluster occupying each disk file. To conserve power, a constraint is established such that at most two clusters are active at a time. No thermal loading constraints are required in an array of this size. The allocation manager, access manager, and power manager handle storage read and write requests as described above, sequencing power among the 8 clusters such that all applicable constraints are satisfied and overall storage cost is minimized.

A snapshot of the low power disk array of FIG. 4 during operation is shown in the table of FIG. 5. The table is organized by cluster number, maximum capacity, available capacity and cluster state (e.g. active—on, inactive—off). It is assumed that the system is powered by batteries, and hence is constrained such that at most disk files can be active at a time. For illustrative purposes, it is further assumed that at the time of the snapshot an incoming dataset of 400 M-bytes is to be stored in the array, that the user has chosen to store data in at least 100 M-byte blocks, and that clusters will not be filled to 100% of capacity if an alternative exists. With only clusters 2 and 8 active, there is not sufficient capacity to store the entire dataset in active files, so 100 M-bytes is stored in cluster 8 while cluster 2 is being deactivated. Since cluster 5 has sufficient capacity (hence lowest cost), cluster 5 is activated while the first 100 M-bytes is being transferred to cluster 8. Once the first 100 M-bytes is transferred to cluster 8, the remaining data is stored in cluster 5. Finally, to complete the storage write request the GVTOC is updated to indicate the cluster locations chosen for the dataset.

VI. Exemplary High Capacity Configuration

Figure 6:
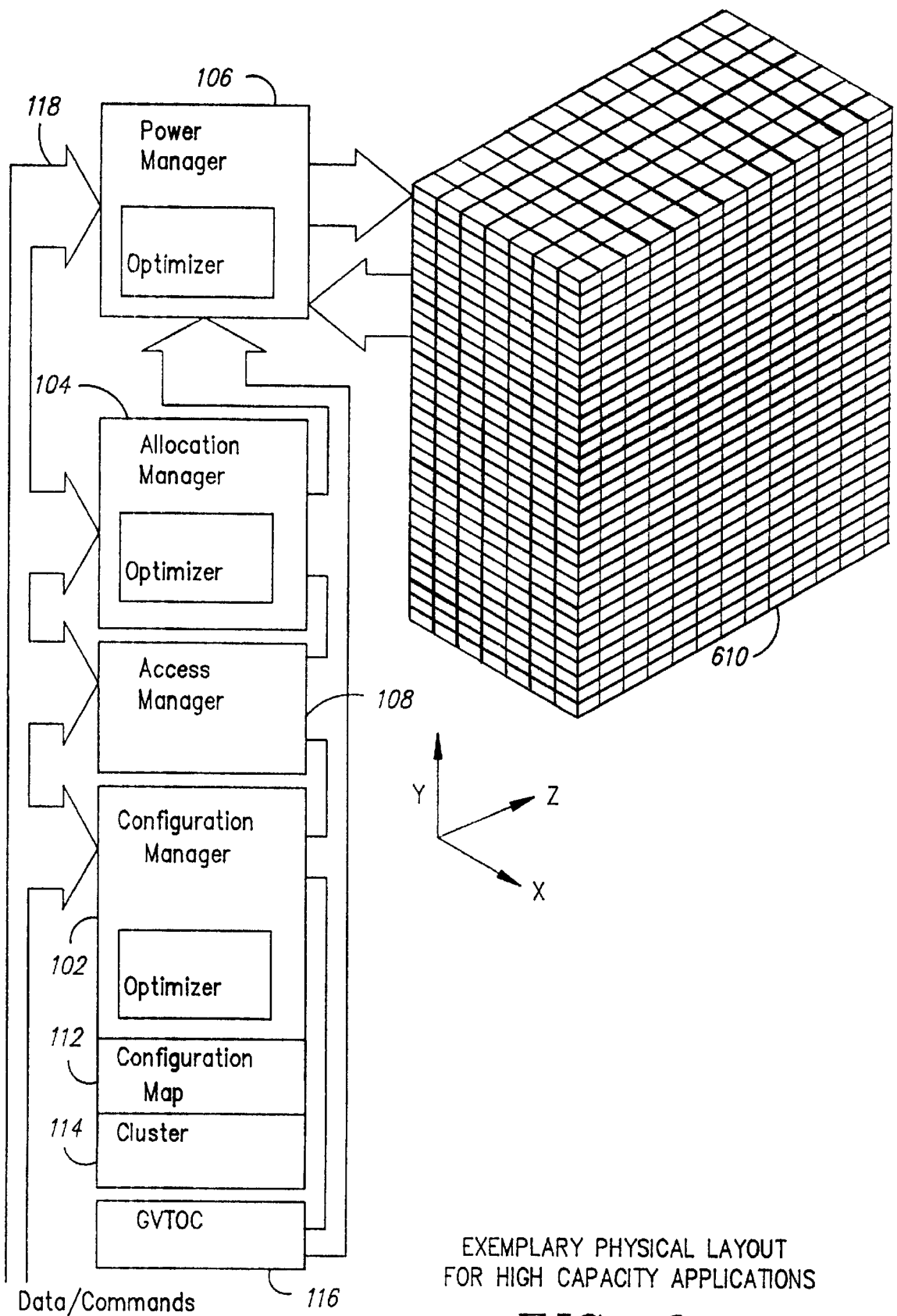
FIG. 6 is a block diagram illustrating an exemplary physical layout for high capacity applications.

Shown in FIG. 6 is a block diagram representing a data storage system which includes a very high capacity disk array. The disk array contains a total of 10,912 disk files, each with a capacity of 5 G-bytes, for an aggregate capacity of 54.56 T-bytes. The user or manufacturer of the exemplary storage system has determined that a desirable configuration is: 15 T-bytes of unprotected data, 15 T-bytes of RAID-3, 15 T-bytes of RAID-5, and the remainder (4.78 T-bytes) mirrored data. This information is provided to the configuration manager at configuration time. The configuration manager determines the number of clusters needed to achieve the requested configuration based on the capacities of the disk files in the disk array and the optimal cluster sizes for the various levels of redundancy. In this example, each cluster is simply assigned the same number of disk files, eight. The result is 375 clusters of unprotected data, 375 clusters of RAID-3 data, 375 clusters of RAID-5 data, and 119 clusters or mirrored data. This information forms the substance of the configuration map.

Next, the configuration manager spreads the clusters across the disk array in accordance with the predetermined constraints and costs. In the present example, it is assumed the local thermal loading constraint allowing no more than 512 adjacent disk files to be active simultaneously, and further that the total thermal loading constraint allows no more than 1024 files to be active throughout the entire array at any time. Based on these constraints, many different clusters layouts could be constructed. For the chosen cluster size of 8 disk files, the approach selected assigns the physical disk files for each cluster to occupy a row in array 610. Thus, cluster 1 consists of the eight disk files at cartersian coordinates y=1, z=1, and x=1 to 8. Similarly, cluster 12 consists of the eight disk files at coordinates y=1, z=12, and x=1 to 8. The complete physical disk file mapping for all the clusters is shown in FIG. 7. This information forms the substance of the cluster map. Finally, based on this information the configuration process is completed when the configuration manager loads the configuration data into the configuration map and the cluster data into the cluster map as described previously.

A snapshot of the first 24 clusters of the data storage system of FIG. 6 during operation is shown in the table of FIG. 8. The table is organized by cluster number. The information shown for each cluster includes redundancy level, maximum capacity, unused capacity, active status, number of disk files in the cluster, and physical positions of the disk files in the disk array. It is to be noted that this information need not be accumulated in a single table in the data storage system, but may instead be subdivided and maintained according to any reasonable schema. All relevant information is shown in compressed into FIG. 8 simply for ease of presentation. Exemplary of the information contained in FIG. 8 is cluster 12. The redundancy level for cluster 12 is mirrored storage having a total capacity of 20 G-bytes; 10 G-bytes are available for new data. The cluster is inactive at the time of the snapshot. It includes 8 physical disk files, located in the disk array at cartesian coordinates y=12, x=1 to 8, and z=1.

To avoid excessive complexity, it will be assumed that clusters 25 and above are full and hence unavailable for data storage. For illustrative purposes, it is further assumed that at the time of the snapshot an incoming dataset is received having 700 Megabytes of data, and that the dataset is targeted for RAID-3 storage. The allocation manager determines the appropriate cluster(s) for the dataset using the configuration map with cost and constraint functions determined according to the principles discussed above. Full clusters and clusters at too low a redundancy level are not considered. Clusters which contain critical information are always assigned low costs so that they will tend to be kept active. Higher redundancy levels are assigned higher costs to reflect the higher overhead associated with storing data at those levels. Active clusters are assigned lower costs than inactive ones to enhance overall storage speed. Optionally, the cost of recovery for various redundancy levels may be factored in. Also, constraints may be used to require file spreading across several clusters, possibly with the first portion of the file assigned to a usually-active cluster.

In the present example, cluster 21 is not considered for use in satisfying the storage request since it is already full.

Assuming cluster 1 to contain critical-availability system data, it is assigned a very low cost, such as 1. The mirrored clusters generally are assigned a high cost, such as 100, to reflect the expense of mirrored storage. Unprotected clusters, which use half the storage space of mirrored clusters, are assigned a cost of 50, RAID-3 storage is more expensive than unprotected storage but less expensive than mirrored storage; accordingly, it is assigned a cost of 60. For RAID-5 storage a cost of 75 is chosen to reflect the relative expense of storage at this level. Additionally, the cost of each inactive cluster is increased by 20 to reflect the performance cost of activating disk files. Finally, a constraint is established to take advantage of the high activity of cluster 1: 10 M-bytes of the incoming file will be stored on cluster 1 and up to 10 M-bytes each will be stored on other clusters until enough space is assembled to contain the entire 700 M-byte dataset. These costs and constraints are merely illustrative; others may be chosen readily by either the designer or the user of the data storage system in accordance with the types of data present, the mix of redundancy levels, and the desired performance.

After eliminating those clusters shown in FIG. 8 that are either full or at a lower redundancy level than RAID-3, the allocation manager develops the following optimization and constraint equations:

$$1F(1) + 95F(2) + 80F(3) + 100F(6) + 75F(7) + 80F(8) + 120F(9) + 95F(10) + 60F(11) + 120F(12) + 75F(13) + 95F(15) + 80F(16) + 95F(17) + 120F(19) + 120F(22) + 80F(23) + 80F(24) = \min$$

and $$10F(1) + A(2)F(2) + A(3)F(3) + \ldots + A(24)F(24) \geq 700$$

where A (i) is a minimum of 100 M-bytes, or the available capacity of cluster i. The allocation manager solves these equations to arrive at the following optimal distribution of data: 10-M-bytes on cluster 1, 100 M-bytes on cluster 11, 100-M bytes each on clusters 7,8,13,16, and 23, and 90 M-bytes on cluster 3.

The allocation manager passes the above-determined cluster list to the power manager, which factors this information into its own cost and constraint equations. In the present example, it is assumed that the system is subject to an additional constraints that at most 4 of the clusters in the range from 1 to 24 may be active at one time and that adjacent clusters may not be active simultaneously. This yields the constraints:

$$F(1) + F(2) + F(3) + F(4) \ldots + F(24) \leq 4$$

and $$F(1) + F(2) < 2$$
$$F(2) + F(3) < 2$$
$$F(3) + F(4) < 2$$
$$\vdots$$
$$F(23) + F(24) < 2$$

The cost optimizing function for the power manager is a linear combination of the requirements from the allocation manager (clusters 1,3,7,8,11,13,16,23) and other pending requests from the allocation manager and the access manager. Assuming for purposes of the present example that there are no other pending requests, the power manager determines its cost function to be:

$$1F(1)+100F(3)+100F(7)+100F(8)+100F+100F(11)+100F(13)+100F(16)+100F(23)=\text{minimum}$$

Referring again to the snapshot status shown in FIG. 8, it is apparent that cluster 6 is to be deactivated since it is not required to fulfill the storage request. Cluster 1, which is already active, will be kept active. Similarly with clusters 7 and 11, except that they will be deactivated after receiving their data allocations since their costs are higher. Clusters 3,8,16,23, and 13 will be made active as permitted by the power and thermal constraints. Since the power constraint allows up to 4 active clusters at a time, the power manager activates cluster 3 while data is being stored on clusters 1,7, and 11. Once the first 110 M-bytes is stored on clusters 1 and 7, cluster 7 is made inactive and cluster 8 is activated. The process continues, with clusters being activated and deactivated as data is stored, until completed. The staging of disk files enables the continuous transfer of data to active files while others are being deactivated and activated. Thus, the time required to activate a disk file does not affect the performance of the data storage system. Moreover, since cluster 1 is always active there is no lag time for initial start-up of a dataset transfer, even if none of the other clusters chosen by the allocation manager are initially active. Finally the GVTOC is updated to show the location of the 700 M-byte dataset in the disk array, and the process is complete.

In conjunction with processing the above-described write request, the data storage system of the present invention may also receive and process additional write requests and/or read requests. Additional write requests would be handled as described above. Read requests are handled by the access manager, which locates the requested dataset by searching for its name in the GVTOC, and then passes the appropriate cluster numbers to the power manager so that the clusters can be activated and the data extracted. Thus, continuing with the exemplary snapshot of FIG. 8, it is assumed a read request is received for a 410 M-byte dataset. The dataset identifier is cross referenced into the system GVTOC, which reveals that the dataset is stored on clusters 1,4,5,18, and 20. This list is provided to the power manager, which constructs costs and constraint equations. If there are no other requests from the access manager or the allocation manager, the power manager would choose to activate clusters based on the equation $$F(1)+F(4)+F(5)+F(18)+F(20)=\max$$

while maintaining the thermal constraints. Assuming the same initial state as FIG. 8, cluster 1 is active but clusters 4, 5, 18, and 20 are inactive. Data is retrieved from cluster 1, while clusters 6, 7, 11, and 13 are being deactivated, and clusters 4, 5, 18, and 20 are being activated. Since clusters 4 and 5 are adjacent they cannot be activated simultaneously, so clusters 4, 18, and 20 are initially activated. After the data has been read from cluster 4, cluster 4 is deactivated, then cluster 5 is activated and its data retrieved. Since the data may not become available in the order in which it was stored, it is staged to a cache separately associated with the data storage system, and assembled into the complete dataset before being supplied to the requesting computer system, all in accordance with techniques well known in the disk controller art.

VII. Conclusion

It is to be noted that while the invention has been described in the context of disk arrays, it is readily applicable to any densely packed electronics system in which it is necessary or desirable to manage power and thermal loading. For instance, random access memory modules having densely packed memory chips may benefit from application of the present invention. Vector processors and parallel computers having many closely spaced circuit boards are additional candidates.

Also, while the invention has been particularly desired and illustrated with reference to a preferred embodiment, it will be understood by those skilled in the art that changes in the description or illustrations may be made with respect to form or detail without departing from the scope of the invention. Accordingly, the present invention is to be considered as encompassing all modifications and variations coming within the scope defined by the following claims.

What is claimed is:

1. A configuration management subsystem for organizing physical disk files in a disk array into logical clusters, comprising:
    means for defining logical clusters of physical disk files;
    means for defining a set of physical disk files corresponding to each of the logical clusters, each of the physical disk files in a given logical cluster being spatially dispersed from other physical disk files in said given logical cluster according to a constraint function; and
    a cluster map for receiving mapping information identifying the logical clusters and the physical disk files corresponding to each of the logical clusters.

2. The configuration management subsystem as recited in claim 1, wherein the constraint function includes a constraint representing the maximum allowable local thermal load within the disk array.

3. The configuration management subsystem as recited in claim 1, wherein the constraint function includes a constraint to maximize the physical dispersion of said physical disk files in said given logical cluster in said disk array.

4. The configuration management subsystem as recited in claim 1, wherein the logical cluster of disk files is defined in accordance with a predetermined configuration established for the disk array.

5. The configuration management subsystem as recited in claim 1, wherein the logical cluster is defined in accordance with a received configuration command.

6. The configuration management subsystem as recited in claim 5, wherein the received configuration command identifies a storage requirement in terms of a redundancy level and a quantity measure.

7. The configuration management subsystem as recited in claim 6, further comprising a configuration map for receiving mapping information identifying the logical cluster and the redundancy level corresponding to the logical cluster.

8. The configuration management subsystem as recited in claim 5, further comprising a configuration map for receiving mapping information identifying the configuration command and the logical cluster corresponding to the configuration command.

9. An allocation management subsystem for assigning data to predetermined logical clusters of disk files in a disk array, comprising:
    an input for receiving a write command identifying data to be stored in the disk array;
    an output for providing a cluster number identifying a logical cluster on which the data is to be stored;
    a cluster map for defining a set of physical disk files corresponding to each of the logical clusters; and
    a data allocation optimizer, coupled to the input, the output and the cluster map, for determining the logical clusters and the corresponding physical disk files on which the data will be stored, the physical disk files in a given logical cluster being spatially dispersed from one another in said given logical cluster in accordance with a constraint function.

10. The allocation management subsystem as recited in claim 9, wherein the write command includes a storage class identifier and a size identifier.

11. The allocation management subsystem as recited in claim 10, wherein the constraint function includes a constraint representing the required storage class for the data.

12. The allocation management subsystem as recited in claim 10, wherein the constraint function includes a constraint representing the storage space required to store the data.

13. The allocation management subsystem as recited in claim 10, wherein the data allocation optimizer further determines the logical cluster on which the data will be stored in accordance with a cost function.

14. The allocation management subsystem as recited in claim 13, wherein the cost function includes a cost associated with storing data in a storage class higher than the required storage class.

15. The allocation management subsystem as recited in claim 13, wherein the cost function includes a cost associated with activating an inactive cluster.

16. The allocation management subsystem as recited in claim 13, wherein the cost function includes a cost associated with filling the unused portion of a cluster.

17. The allocation management subsystem as recited in claim 9, wherein the constraint function includes a constraint representing the required performance for access to the data.

18. The allocation management subsystem as recited in claim 10, wherein the constraint function includes a striping constraint representing the required spreading of the data across multiple clusters.

19. A configuration management subsystem for organizing physical disk files in a disk array into logical clusters, comprising:
    means for defining logical clusters of physical disk files;
    means for defining a set of physical disk files corresponding to each of the logical clusters, each of the physical disk files in a given logical cluster being spatially dispersed from other physical disk files in said given logical cluster according to a constraint function such that all the physical disk files in said given logical cluster can be active at the same time; and
    a cluster map for receiving mapping information identifying the logical clusters and the physical disk files corresponding to each of the logical clusters.

20. The configuration management subsystem as recited in claim 19, wherein the constraint function includes a constraint representing the maximum allowable local thermal load within the disk array.

21. The configuration management subsystem as recited in claim 19, wherein the constraint function includes a constraint to maximize the physical dispersion of disk files in said disk array.

22. The configuration management subsystem as recited in claim 19, wherein the logical cluster of disk files is defined in accordance with a predetermined configuration established for the disk array.

23. The configuration management subsystem as recited in claim 19, wherein the logical cluster is defined in accordance with a received configuration command.

24. The configuration management subsystem as recited in claim 23, wherein the received configuration command identifies a storage requirement in terms of a redundancy level and a quantity measure.

25. The configuration management subsystem as recited in claim 24, further comprising a configuration map for receiving mapping information identifying the logical cluster and the redundancy level corresponding to the logical cluster.

26. The configuration management subsystem as recited in claim 23, further comprising a configuration map for receiving mapping information identifying the configuration command the logical cluster corresponding to the configuration command.

27. A configuration management subsystem for organizing physical disk files in a disk array into logical clusters, comprising:

means for defining logical clusters of physical disk files;

means for defining a set of physical disk files corresponding to each of the logical clusters, each of the physical disk files in a given logical cluster being spatially dispersed from other physical disk files in said given logical cluster according to a constraint function such that at least one physical disk file in said given logical cluster is spatially separated from another physical disk file in said given logical cluster by a physical disk file corresponding to another logical cluster; and a cluster map for receiving mapping information identifying the logical clusters and the physical disk files corresponding to each of the logical clusters.

28. A configuration management subsystem for organizing physical disk files in a disk array into logical clusters, comprising:

means for defining logical clusters of physical disk files;

means for defining a set of physical disk files corresponding to each of the logical clusters, each of the physical disk files in a given logical cluster being spatially dispersed from other physical disk files in said given logical cluster according to a constraint function;

a cluster map for receiving mapping information identifying the logical clusters and the physical disk files corresponding to each of the logical clusters; and a storage manager for placing non-used logical cluster or logical clusters in an inactive mode.

* * * * *

UNITED STATES PATENT AND TRADEMARK OFFICE
CERTIFICATE OF CORRECTION

PATENT NO.    : 5,900,007
DATED         : May 4, 1999
INVENTOR(S)   : Lewis Lee Nunnelley, Larry Lynn Williams and Leighton Christopher Wood, Jr.

It is certified that error appears in the above-identified patent and that said Letters Patent is hereby corrected as shown below:

Column 8,
Line 33, delete "optional" and insert -- optimal --.

Column 11,
Line 63, delete "100F+" from the equation.

Signed and Sealed this

Twenty-first Day of January, 2003

JAMES E. ROGAN
*Director of the United States Patent and Trademark Office*